July 27, 1965 C. E. JOHNSON, JR 3,196,682
HUMIDITY SENSING CIRCUIT
Filed May 13, 1963
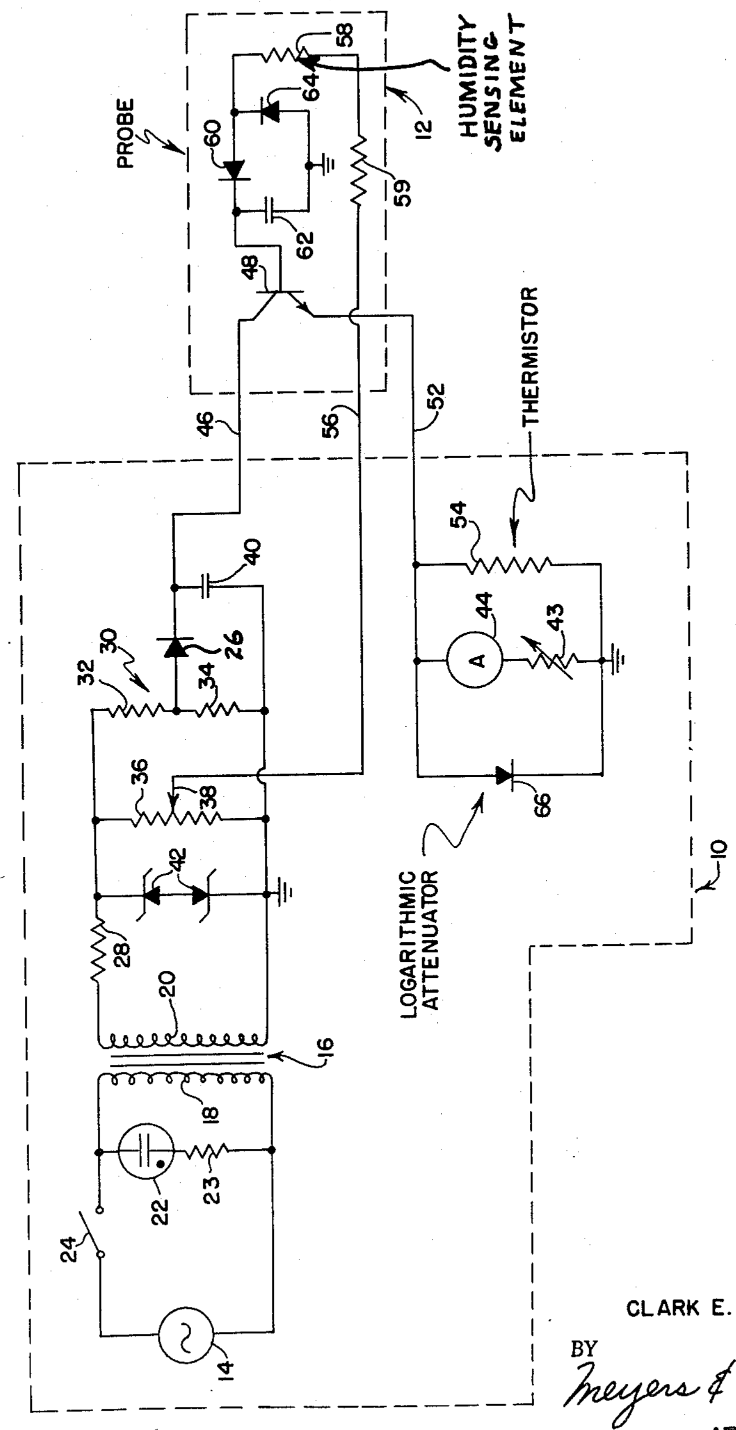
INVENTOR.
CLARK E. JOHNSON, JR.
BY Meyers & Peterson
ATTORNEYS United States Patent Office 3,196,682

Patented July 27, 1965

3,196,682

HUMIDITY SENSING CIRCUIT

Clark E. Johnson, Jr., Minneapolis, Minn., assignor to Bacharach Industrial Instrument Company, Pittsburgh, Pa., a corporation of Pennsylvania Filed May 13, 1963, Ser. No. 280,504
7 Claims. (Cl. 73—336.5)

This invention relates generally to meters for measuring humidity, and pertains more particularly to a humidity sensing circuit utilizing a humidity responsive resistance as the sensor. This application is a continuation-in-part of my application for Humidity Sensing Circuit, Serial No. 147,596, filed October 25, 1961.

One object of the invention is to provide a humidity sensing circuit that produces a linear output even though the humidity responsive element itself has an exponential response to humidity.

Another object of the invention is to provide a humidity sensing circuit that will measure relative humidity with considerable accuracy within a relatively wide temperature range. In this regard, the invention has for an aim the prevention of polarization of the humidity responsive element. More specifically, it is planned that the humidity responsive element, which is of the resistance type, will be subjected to an alternating current signal which precludes polarization from taking place.

The invention has for an additional object the provision of a circuit that will be virtually insensitive to line voltage fluctuations.

Yet another object of the invention is to provide a circuit of the foregoing type that will be compact, lightweight, and readily movable from place to place. It is also within the purview of the invention to provide the circuit with a probe that can be inserted into relatively inaccessible places, it not being necessary that the power supply means in the meter be located close to the probe.

These and other objects and advantages of my invention will more fully appear from the following description, made in connection with the accompanying drawing in which:

The sole figure constituting the drawing is a schematic representation of my humidity sensing circuit.

Referring now in detail to the drawing, it will be observed that the circuitry comprises two units 10 and 12, the latter being in the form of a probe which may be inserted into relatively inaccessible places. The unit 10 is designed to be connected to a conventional alternating current source of electric power which has been denoted by the reference numeral 14. This source 14 may be a conventional domestic 115 volt outlet.

The unit 10 comprises a transformer 16 having a primary winding 18 and a secondary winding 20. A neon indicating lamp 22 is connected in series with a current limiting resistor 23 across the ends of the primary winding 18. The indicating lamp 22 will signify when a switch 24 is closed for the purpose of energizing the transformer 16 from the power source 14.

Before proceeding further, it can be pointed out that the components described above constitute an alternating current supply means. Therefore, the opopsite ends of the winding 20 may be considered to be the first and second sides of the supply means and will at times be referred to as such.

A dropping resistor 28 and a voltage divider 30 composed of resistance portions 32, 34 are connected in series across the end of the secondary winding 20. For a purpose hereinafter made manifest, a potentiometer 36 is also connected directly across the ends of the winding 20, this potentiometer having a slider 38. To provide voltage stabilization, a pair of Zener diodes are connected in a back-to-back relationship across the secondary winding 20 as illustrated in the drawing.

Connected to the voltage divider 30 at the juncture of the resistance portions 32, 34 is a diode 26. For the purpose of providing a needed filtering action, a capacitor 40 is connected between the diode 26 and second side of the power means, this being the lower end of the winding 20.

While the unit 10 contains still further components yet to be described, it will now be of help to refer to the unit 12 in detail. In this regard, it is noted that a conductor 46 connects the diode 26 of the unit 10 to a transistor 48 which has been depicted as of the N-P-N type, suggestively a 2N929 or 2N930 transistor. The transistor includes conventional collector, emitter and base electrodes. The collector is connected to the conductor 46, whereas the emitter of the transistor is connected via a conductor 52 to an ammeter 44 in series with a variable resistor 43, the resistor 43 and the ammeter 44 (located in the unit 10) being connected serially between the conductor and ground. This ammeter 44 should be extremely sensitive inasmuch as it will measure current flow on the order of $10^{-6}$ ampere. While the ammeter 44, more precisely a microammeter, actually reads current, the face thereof will be calibrated so as to indicate relative humidity. The resistor, as will be better understood later, can be adjusted to control the cross-over point where the output becomes linear with relative humidity. A thermistor 54 is connected in parallel with the resistor 43 and ammeter 44, the thermistor having one end connected to the conductor 52 with its other end grounded and thereby connected to the lower end of the transformer winding 20 inasmuch as this particular end of the transformer winding 20 is also grounded.

A third conductor 56 extends between the unit 10 and the unit 12 and is shown as being connected at one end to the slider 38 of the potentiometer 36 and at its other end to a humidity responsive resistor 58 which serves as the humidity sensor. More specifically, the resistor 58 is preferably a semiconductor whose electrical resistance changes instantly with changes in humidity. A fixed resistor 59 is placed in series with the humidity responsive resistor 58 for the purpose of limiting the current into the base of the transistor 48 should something go amiss with the humidity responsive resistor 58.

Whereas the conductor 56 is connected to one side of the humidity responsive resistor 58, the circuit will show that a diode 60 is connected between the other side of the resistor and the base of the transistor 48. A capacitor 62 is connected from a point intermediate the diode 60 and the base of the transistor 48 to ground and hence to the lower end of the transformer winding 20.

Of importance to an effective practicing of the instant invention is a diode 64 which carries from ground to a point between the humidity responsive resistor 58 and the diode 60. It can be explained at this time that the diode 60 is oriented or poled so that its low resistance path will be in a direction away from the resistor 58 and toward the base of the transistor 48. On the other hand, it should be observed that the low resistance path of the diode 64 is in a direction from ground to the juncture or point lying between the resistor 58 and the diode 60. Both of the diodes 60, 64 should have a very high back resistance.

Inasmuch as the semiconductor sensor labelled 58 will have an exponential response to humidity, it is an aim of the invention to provide a linear output so that the ammeter 44 can be more readily calibrated and which will, of course, result in a much easier reading. Accordingly, the present invention evisages the use of a logarithmic attenuator in the form of a diode 66, the particular type having been found very satisfactory being identifiable as type G129 manufactured by Texas Instruments. Thus, from what has been said, it will be perceived that the thermistor 54, the ammeter 44 and its resistor 43, and the attenuator 66 form the parallel circuit arrangement clearly shown in the drawing.

Having provided the foregoing information, the manner in which my humidity sensing circuit operates should be readily understood. With the switch 24 closed, it will be seen that an appropriate voltage will be impressed on the voltage divider 30 from the source 14 and via the transformer 16. Inasmuch as the ammeter 44 and the collector-emitter path of the transistor 48 are connected across the lower portion 34 of the divider 30, there will be a flow of current through the ammeter 44 dependent upon the degree of conduction of the transistor 48 when biased in a forward direction.

The amount of forward bias is controlled by the humidity responsive resistor 58 which is in the base circuit of the amplifying transistor 48. Hence, when the resistance value of this sensor is loaded to an extent determined by the amount of moisture in the ambient air for a particular temperature, then the transistor 48 will become conductive to an extent representative of the atmospheric humidity or whatever space is sensed by the probe unit 12. It can be pointed out that the value of the resistor 58 will be virtually zero at 100 percent relative humidity so with the resistor 58 shorted out, that is, with just the resistor 59 in the circuit, the meter 44 can be made to read full scale by moving the slider 38 until a full scale reading is noted. These are usually factory adjustments. If a limited range on the meter scale is desired, then this can be effected by changing the value of the resistor 59 and by appropriately adjusting the setting of the slider 38. If the ammeter's scale is properly calibrated, reliable readings at all values can be made. The diode 60, of course, acts as a rectifier to apply only a direct current biased to the base of the transistor 48, the capacitor 62 acting to smooth out any undulations in the base signal. The thermistor 54, which decreases its resistance with increasing temperature, bypasses some of the output current in such a way as to compensate for an increase in amplifier gain with temperature.

At this time, attention is focused on the role played by the diode 64. Whereas the preceding operational description has been concerned essentially with D.-C. operation, it is to be appreciated that by reason of the diode 64 and its connection in the probe circuitry, an A.-C. signal is applied to the resistor 58. Stated somewhat differently, when the first side of the supply means, that is, the upper end of the secondary winding, becomes positive, there is conventional current flow through the diode 26 and the resulting current through the ammeter 44 is representative of the amount of humidity, this being so because of the biasing control exercised through the agency of the humidity responsive resistor 58. However, when the lower end of the second side of the supply means, that is, the secondary winding 20, goes positive, there is a flow of current via the grounded connection thereof and the grounded connection of the diode 64, the resistor 58, the resistor 59, the conductor 56 and the slider 38 which is connected back to the upper side of the winding 20 through the dropping resistor 28. The point to be appreciated, though, is that polarization of the humidity responsive resistor 58 is obviated with the circuitry of the instant invention because of the constant reversal of current therethrough. This is quite important as far as obtaining an accurate and reliable humidity reading.

It might be helpful to include a brief mathematical basis at this point. First of all, one simplifying assumption that will be made is that all of the amplifier output current (from the emitter current of the transistor 48) passes through the attenuator diode 66. In practice, this is not true, since the ammeter 44 requires some current to operate it. The effect of the loading of the meter on the circuit is particularly bad at low output current (low relative humidity). If the output indicator were a high impedance voltmeter, for example, a vacuum tube voltmeter, then the output would be strictly linear with relative humidity.

Another consideration is the necessity to maintain the value of resistor 59 appreciably lower than the lowest value of the humidity sensing resistor 58. In practice, this is done by limiting the value of resistor 59 to about one megohm which the lowest value of the humidity sensing resistor 58 is about ten megohms at 100 percent relative humidity.

The characteristics of a G129 diode can be expressed as follows:

$$E_{66}=k \log I_{66}$$

where $E_{66}$=voltage across the diode 66.
$I_{66}$=current through the diode 66.

Also, the resistance of the humidity sensing element, which is inversely exponentially proportional to relative humidity, can be expressed as follows:

$$R_{58}=R_0 e^{-\alpha(RH)}$$

where $R_{58}$ is the resistance of the humidity responsive resistor element 58.
$R_0$=intrinsic resistance of $R_{58}$ at 0% RH.
$\alpha(RH)$=exponential variation of element 58.

Because of the foregoing two assumptions and the preceding two equations, the following equation eixsts:

$$E_o=k \log \beta E R_0+\alpha(RH)$$

where $E_o$=the output voltage.
$k$=a constant.
$\beta$=amplifier gain.
$E$=supply voltage from winding 20.
$R_o$=intrinsic resistance of $R_{58}$ at 0% RH (as indicated above).
$\alpha(RH)$=exponential variation of resistor 58 (as indicated above).

Thus, the output voltage $E_o$, and consequently the current through the meter 44, has two factors: (1) a factor logarithmic in amplifier gain, supply voltage and intrinsic humidity sensing element resistance, and (2) linear with respect to relative humidity. From this, it can be seen that changes in the supply voltage and amplifier gain affect the meter reading only logarithmically.

Consequently, the humidity sensing circuitry of the present invention will find utility in a number of applications where precise knowledge of humidity is important. Typical uses would include laboratory testing, controlling humidity in computer centers and test chambers and in various drying applications. Of course, the invention would not be limited to these several uses but would have rather widespread application for humidity measuring needs.

It will, of course, be understood that various changes may be made in the form, details, arrangements and proportions of the parts without departing from the scope of my invention as set forth in the appended claims.

What is claimed:

1. A humidity sensing circuit comprising:
(a) alternating current supply means;
(b) a first diode;
(c) a transistor having a collector, emitter and base;
(d) an ammeter;
(e) means connecting said first diode, collector and emitter, and ammeter in series with said supply means;
(f) resistance means connected across said supply means having an intermediate tap;

(g) a humidity responsive resistor;
(h) a second diode;
(i) means connecting said resistor and second diode in series between said tap and said base, said second diode providing a low resistance path between said tap and base, and
(j) a third diode providing a low resistance path between said supply means and a point intermediate said resistor and said second diode.

2. A humidity sensing circuit in accordance with claim 1 including:
(a) a fourth diode connected in parallel with said ammeter for providing a logarithmic attenuation of the output signal delivered to said ammeter from said transistor.

3. A humidity sensing circuit in accordance with claim 2 including:
(a) a capacitor connected between said supply means and a point intermediate said second diode and said base.

4. A humidity sensing circuit in accordance with claim 3 in which:
(a) said transistor, humidity responsive resistor, said second and third diodes, and said capacitor are all grouped together to constitute a probe unit.

5. A humidity sensing circuit comprising:
(a) alternating current supply means having first and second sides;
(b) a first diode;
(c) a dropping resistor;
(d) a voltage divider including two resistance portions providing a junction therebetween;
(e) means connecting said diode, resistor and divider in series across said supply means;
(f) a potentiometer connected directly across said supply means from a point intermediate the first side thereof and said diode to the second side thereof;
(g) a voltage regulating device connected across said voltage divider;
(h) an ammeter;
(i) a transistor having a collector, emitter and base;
(j) means connecting said ammeter, collector and emitter in series between said junction and said second side of the supply means;
(k) a humidity responsive resistor;
(l) a second diode;
(m) means connecting said humidity responsive resistor in series with said second diode between said slider and base, said second diode providing a low resistance path between said humidity responsive resistor and said base;
(n) a capacitor connected between a point intermediate said second diode and said base to the second side of said supply means, and
(o) a third diode connected in a low resistance direction between said second side of said supply means and a point intermediate said humidity responsive resistor and said second diode.

6. A humidity sensing circuit in accordance with claim 5 in which:
(a) said supply means includes a transformer having primary and secondary windings, the ends of said secondary winding providing said first and second sides;
(b) a source of alternating current power connected to said primary winding through a disconnect switch, and
(c) an indicating lamp connected across the ends of said primary winding for signifying when said transformer is being energized from said source.

7. A humidity sensing circuit comprising:
(a) alternating current supply means;
(b) a transistor having a collector, emitter and base;
(c) an ammeter;
(d) first circuit means connected to said supply means providing a direct current path through said collector, emitter and said ammeter;
(e) second circuit means connected to said supply means including a humidity responsive resistor and a diode for passing direct current through said resistor in one direction, said diode being connected to the base of said transistor to control the forward bias of said transistor in accordance with atmospheric humidity affecting said resistor and hence the flow of current through said ammeter, and
(f) third circuit means for reversing the flow of current through said humidity responsive resistor, said third circuit means being connected to said resistor to prevent polarization of said resistor, said reversing occurring each time the polarity of the alternating current furnished by said supply means reverses.

References Cited by the Examiner

UNITED STATES PATENTS

| | | | |
|---|---|---|---|
| 1,836,934 | 12/31 | Morecroft | 324—119 |
| 2,412,782 | 12/46 | Palmer | 73—336.5 |
| 2,508,478 | 5/50 | Uehling | 73—362 |
| 2,571,458 | 10/51 | Lawrence et al. | 324—132 |
| 2,629,054 | 2/53 | Craig | 73—336.5 X |
| 2,684,592 | 7/54 | Hadady | 73—336.5 |
| 2,757,281 | 7/56 | Le Bel | 324—132 |
| 2,991,653 | 7/61 | Thompson | 73—336.5 |
| 3,022,667 | 2/62 | Wexler et al. | 73—336.5 |
| 3,036,464 | 5/62 | Beeston | 73—342 |
| 3,046,623 | 7/62 | Dietert et al. | 324—65 |

FOREIGN PATENTS

| | | |
|---|---|---|
| 404,498 | 1/34 | Great Britain. |
| 861,582 | 2/61 | Great Britain. |

ISAAC LISANN, *Primary Examiner.*